(12) United States Patent
Kaufthal

(10) Patent No.: US 10,841,534 B2
(45) Date of Patent: Nov. 17, 2020

(54) REAL-WORLD AWARENESS FOR VIRTUAL REALITY

(71) Applicant: Microsoft Technology Licensing, LLC, Remond, WA (US)

(72) Inventor: Jonathan S. Kaufthal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/951,685

(22) Filed: Apr. 12, 2018

(65) Prior Publication Data
US 2019/0320138 A1   Oct. 17, 2019

(51) Int. Cl.
*H04N 7/15* (2006.01)
*H04M 3/42* (2006.01)
*G06K 9/00* (2006.01)

(52) U.S. Cl.
CPC .......... *H04N 7/15* (2013.01); *G06K 9/00268* (2013.01); *H04M 3/42042* (2013.01)

(58) Field of Classification Search
CPC .......... H04N 7/15; H04N 7/147; H04N 7/152; G09G 5/38; G09G 2345/00; G09G 2340/12; G06F 3/16; G06F 3/04817; G02B 27/0172; G06T 11/60; G06T 19/006; G06T 2200/24; G09T 11/001
USPC ............................ 348/14.08, 14.02; 455/416
See application file for complete search history.

(56) References Cited

U.S. PATENT DOCUMENTS

| | | | |
|---|---|---|---|
| 9,338,627 | B1 | 5/2016 | Singh et al. |
| 2016/0026253 | A1 | 1/2016 | Bradski et al. |
| 2016/0054565 | A1 | 2/2016 | Izumihara et al. |
| 2017/0103571 | A1 | 4/2017 | Beaurepaire |
| 2017/0139207 | A1* | 5/2017 | Jenabzadeh ............. G06F 3/011 |
| 2017/0173454 | A1 | 6/2017 | Begum et al. |
| 2017/0243465 | A1 | 8/2017 | Bourne, Jr. et al. |
| 2017/0287215 | A1 | 10/2017 | Lalonde et al. |

(Continued)

OTHER PUBLICATIONS

"Methods and systems for providing seamless transition between Virtual Reality (VR) environment and real environment", Retrieved From «http://ipindiaonline.gov.in/patentsearch/GrantedSearch/pdfviewer.aspx», Apr. 11, 2016, 31 Pages.

(Continued)

*Primary Examiner* — Rasha S Al Aubaidi
(74) *Attorney, Agent, or Firm* — Talem IP Law, LLP

(57) ABSTRACT

Techniques and systems for providing real-world awareness for virtual reality are disclosed. In response to determining that a virtual reality application is in use, an awareness module can begin monitoring for external signals by at least accessing an available sensor of a computing device. In response to detecting the at least one external signal, the awareness module can determine a level of notification for an interruption notification of the virtual reality application based on the at least one external signal. The awareness module can receive context of the virtual reality application. A type for the interruption notification of the virtual reality application can be determined based on the determined level of notification and the context of the virtual reality application. The interruption notification may be provided to the virtual reality application based on the determined type.

20 Claims, 10 Drawing Sheets

(56) References Cited

U.S. PATENT DOCUMENTS

2017/0358141 A1     12/2017  Stafford et al.
2019/0066630 A1*     2/2019  Fukazawa ................. G06F 3/14
2019/0279407 A1*     9/2019  McHugh ................. G06F 3/048
2019/0317718 A1*    10/2019  George ................. G06T 19/006

OTHER PUBLICATIONS

Panchal, Nishant, "NotifiVR: Stay Connected to the Real World while in VR", Retrieved From «http://nishantdp.com/projects/NotifiVR.html», Retrieved on: Dec. 19, 2017, 20 Pages.

Valente, et al., "Live-action Virtual Reality Games", In Journal of Computing Research Repository, Jan. 2016, 10 Pages.

"International Search Report and Written Opinion Issued in PCT Application No. PCT/US2019/024164", dated Jul. 8, 2019, 13 Pages.

* cited by examiner

| Type of Interruption Notification | | Level of Notification | | |
|---|---|---|---|---|
| | | 1 | 2 | 3 |
| Context of Virtual Reality Application | High-Intensity VR Application | Only Activity Indicator | Abstract Representation at Edge of View; 50% Transparent | Still Image at Edge of View; 50% Transparent |
| | Low-Intensity VR Application | Still Image at Top Right Corner of View | Still Image at Center of View | Live Video at Full Screen |
| | High Level of Productivity or Immersion | Only Activity Indicator | Abstract Representation at Edge of View | Abstract Representation at Center of View |
| | Low Level of Productivity or Immersion | Abstract Representation at Top Right Corner of View | Still Image at Top Left Corner of View | Still Image at Center of View |

FIG. 3

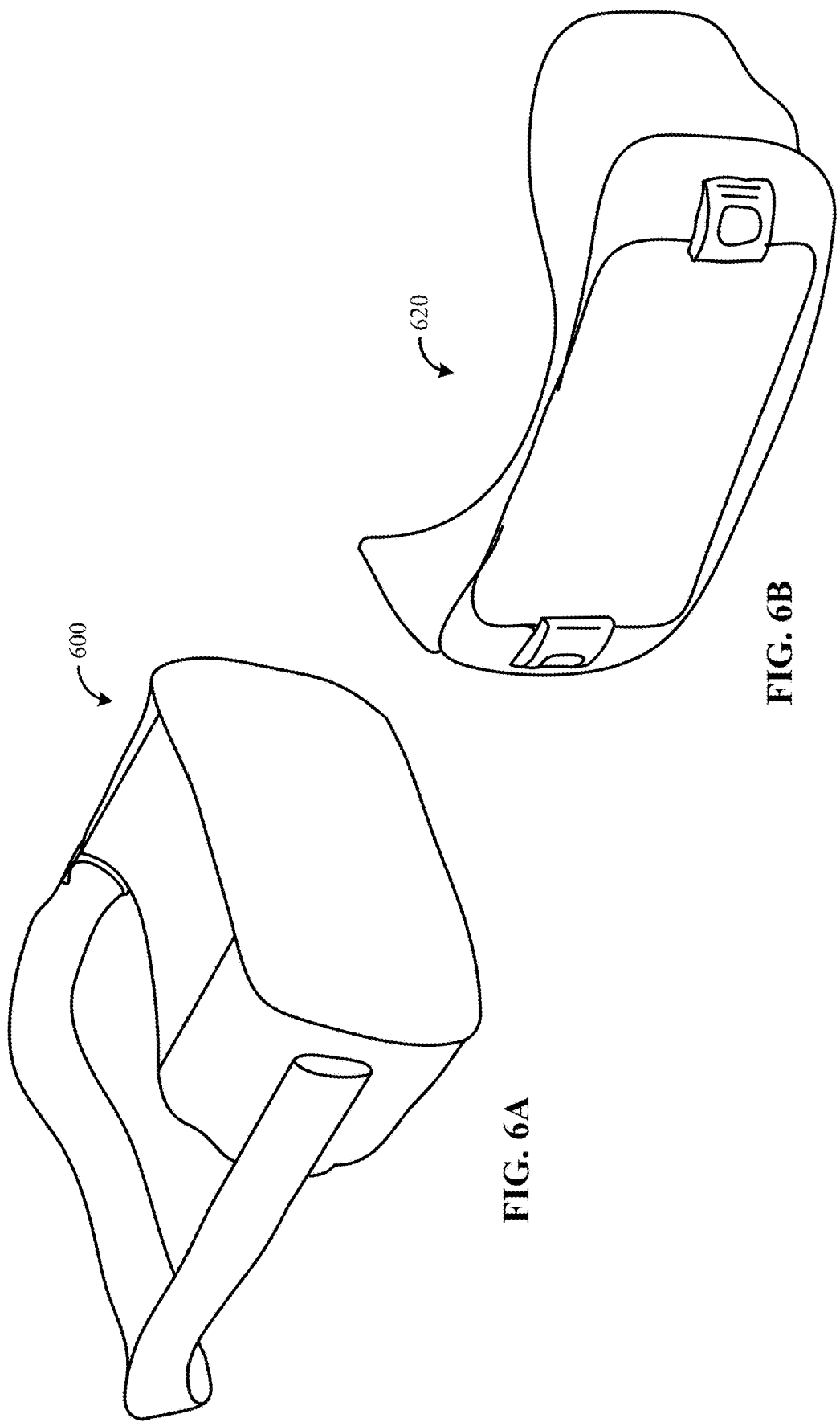

REAL-WORLD AWARENESS FOR VIRTUAL REALITY

BACKGROUND

Virtual reality can refer to a fully immersive, computer-generated experience. For example, a user can put on a headset, and everything in the user's field of view is a pixel. In comparison, augmented reality and mixed reality include experiences in which reality is supplemented with additional information such as available on a heads-up display, overlay, or on a mobile device. Augmented reality and mixed reality are similar, but mixed reality takes augmented reality one step further so that not only is the real world and the digitally represented world available, the digitally represented objects interact with the real-world element. For example, holograms can be rendered in the real world and appear to interact with objects in the physical world.

When operating in virtual reality, a user may interact with the virtual environment and manipulate objects or perform actions. The scenarios enacted in virtual reality can be grounded in reality or be fantastical. Many virtual reality programs are directed to simulations for medical or military training, involve games, or enable a user to explore a destination, including famous landmarks and galleries.

Virtual reality headsets are one mechanism to provide an immersive virtual reality experience to a user. Virtual reality (VR) headsets may fall within one of three categories: mobile (e.g., supported by a mobile device or smartphone), console (e.g., for use with a gaming system), personal computer (e.g., connected to a computing system for extensive processing), and stand-alone VR. In general, VR headsets include or can be connected to a stereoscopic display, speakers, and tracking sensors (e.g., for detecting head motion).

BRIEF SUMMARY

Techniques and systems for providing real-world awareness for virtual reality are disclosed. Cameras, microphones, and other sensors can be utilized to let a user quickly "peek" into the real world without leaving the VR environment. The "peek" into the real world can happen instantly and without the user needing to remove any hardware.

An awareness module executing on a computing device associated with a VR headset can determine that a virtual reality application is in use. In response to determining that the virtual reality application is in use, the awareness module can begin monitoring for external signals by at least accessing an available sensor of a computing device. The awareness module can detect at least one external signal while monitoring for the external signals. In response to detecting the at least one external signal, the awareness module can determine a level of notification for an interruption notification of the virtual reality application based on the at least one external signal. The awareness module can receive context of the virtual reality application. A type for the interruption notification of the virtual reality application can be determined based on the determined level of notification and the context of the virtual reality application. The interruption notification may be provided to the virtual reality application based on the determined type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 illustrates an example mapping data structure used to map the type of interruption notification.

FIGS. 6A and 6B illustrate example configurations of a VR device.

DETAILED DESCRIPTION

Figure 1A:
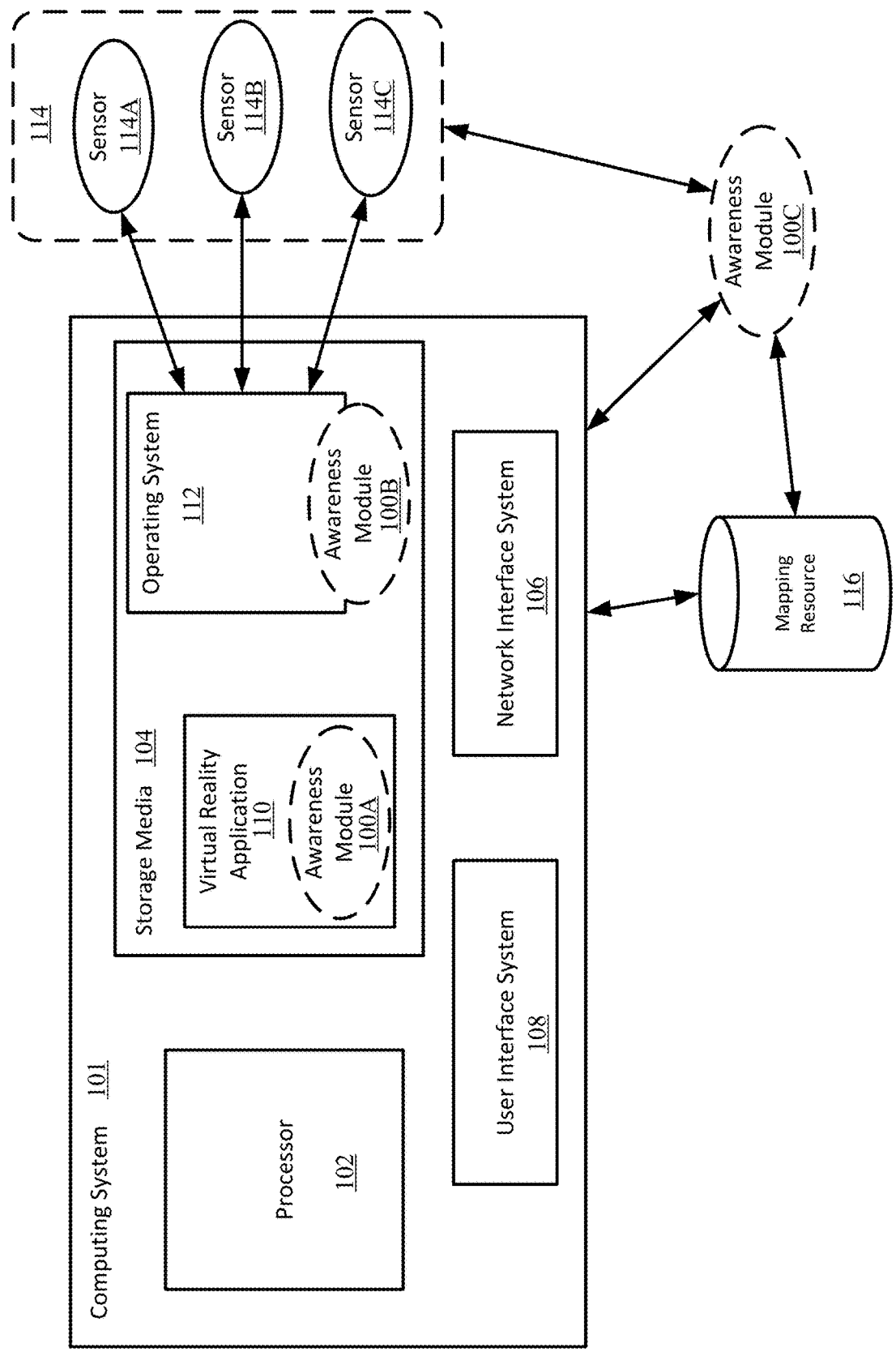
FIG. 1A illustrates an example operating environment in which real-world awareness for virtual reality may be carried out.

Techniques and systems for providing real-world awareness for virtual reality are disclosed. Virtual reality (VR) can isolate users from the outside world. Advantageously, the described techniques and systems allow a user to remain immersed in the VR environment, yet not feel apprehensive about working in a public space or busy office environment. The described techniques and systems perform real-world awareness for virtual reality by providing interruption notifications to a VR application. Indeed, cameras, microphones, and other sensors can be utilized to let a user quickly "peek" into the real world without leaving the VR environment. The "peek" into the real world can happen instantly and without the user needing to remove any hardware.

Certain techniques set forth herein with respect to real-world awareness may be described in the general context of computer-executable instructions, such as program modules, executed by one or more computing devices including VR devices. Generally, program modules include routines, programs, objects, components, and data structures that perform particular tasks or implement particular abstract data types.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

The described techniques and systems are applicable for any applications running in a virtual reality environment, and are referenced to herein as "virtual reality applications". The virtual reality applications may be media applications (e.g., videos, television, movies), gaming applications, and productivity applications. Productivity applications include content creation and content consumption applications including, but not limited to, word processing applications, spreadsheet applications, presentation applications, note-taking application, whiteboard applications, email or messaging applications, drawing applications, web browser applications, search and research applications, and reader applications.

An awareness module can determine that a virtual reality application is in use. In response to determining that the virtual reality application is in use, the awareness module can begin monitoring for external signals by at least accessing an available sensor of a computing device. The awareness module can detect at least one external signal while monitoring for the external signals. In response to detecting the at least one external signal, the awareness module can determine a level of notification for an interruption notification of the virtual reality application based on the at least one external signal. The awareness module can receive context of the virtual reality application. A type for the interruption notification of the virtual reality application can be determined based on the determined level of notification and the context of the virtual reality application. The interruption notification may be provided to the virtual reality application based on the determined type.

An "interruption" of a VR environment is anything that may take the user outside of their activity. An interruption may be, for example, a pause to operation or a pop-up of audio or still or moving images from outside the application. A level of notification refers to how important and/or urgent an interruption is to the user of a VR system. An interruption notification refers to a notification provided to the user of a VR system of information about the real-world surroundings. The interruption notification may include a text-based or audio-based notification of an event and/or images or video of the real-world environment. Through the described techniques, the interruption notification can vary in intensity and form based on the context of operation of the device and the user interaction.

The described techniques and systems can optimize a VR experience around the goal of respecting the user's intention and balancing their immersion with a desire to not be completely isolated. A user immersed in a VR environment can be provided the ability to interact with the real-world environment when the context calls for it, such as in an emergency, necessary interaction (such as if the user is waiting for a friend when the friend arrived), and in response to specific events.

An interruption notification can be initiated a variety of ways. A user may ask for an interruption notification through, for example, a voice command, a gesture, or a click. In some cases, the interruption notification may be initiated through a pre-set interval or alarm. In some cases, the interruption notification may be initiated when a loud noise or high amount of movement is detected. In some cases, the interruption notification may be initiated when a keyword, such as a user's name, "excuse me", or "help!" is spoken or a VIP face or voice is recognized. For example, a user may indicate that the awareness module should always interrupt for a boss or a spouse.

For example, if a user is in a coffee shop working on a spreadsheet using a VR device and a friend, boss, or spouse of the user walks in the coffee shop, as detected by the external camera of the VR device and recognized by the system, an interruption notification that the person of interest is in view may be provided to the user. A person of interest can include a friend, a relative, a contact, colleague, a friend of a friend, a person the user traded email with but isn't included in the user's contact list, even a celebrity, or a felon, etc.

Further, different types of interruption notifications may be provided. For example, for certain persons of interest, the VR device may show real-time video of the surrounding in varying degrees of transparency so that the user can interact with those persons of interest immediately. For other persons of interest, a simple interruption notification on the side of the screen may be provided. In another example, if the context is that the user is working on a high-importance document or watching a live stream of an important meeting, the interruption notification may be minimized so as not to interrupt the work. But if context is that the user is watching a video of cats playing with a toy, then the video may be paused, and live videos of the surrounding may be shown.

Figure 1B:
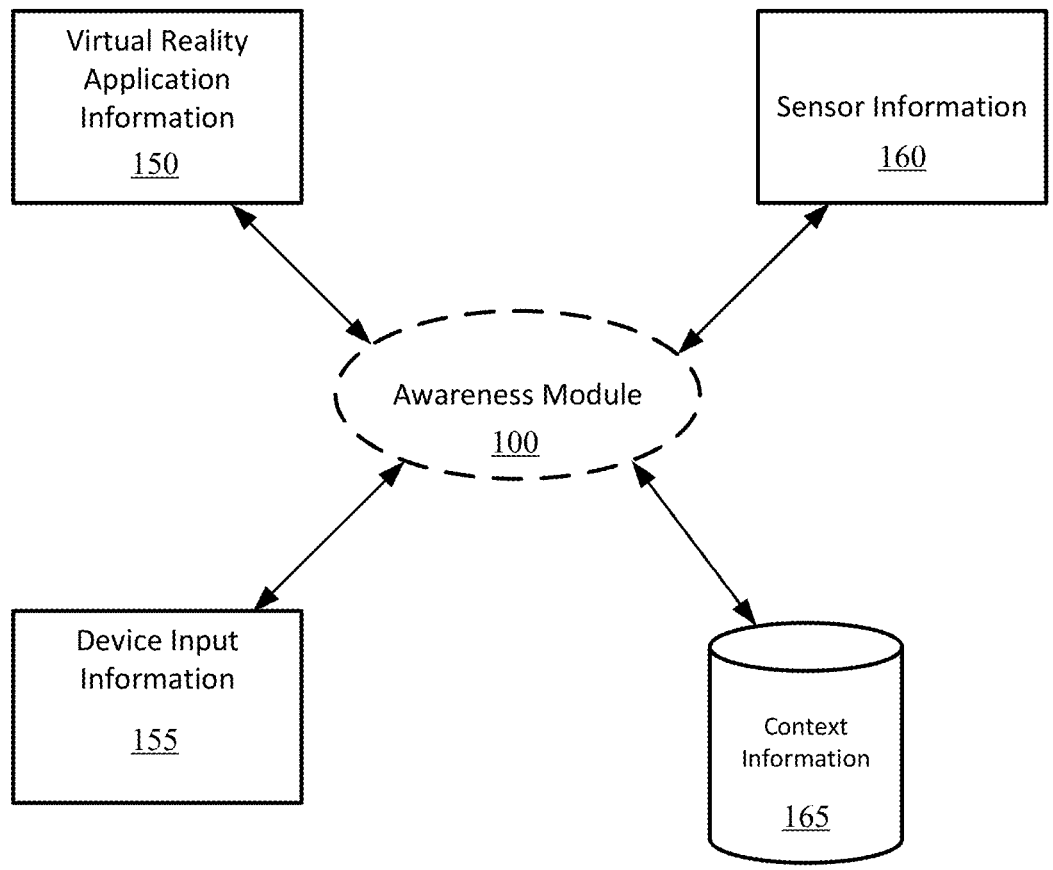
FIG. 1B illustrates an example operating architecture.

FIG. 1A illustrates an example operating environment in which real-world awareness for virtual reality may be carried out; FIG. 1B illustrates an example operating architecture. An awareness module 100 (e.g., awareness module 100A, awareness module 100B, and awareness module 100C) performing processes such as process 200 described with respect to FIG. 2 can be implemented by a system 101, which can be embodied as described with respect to computing system 500 as described with respect to FIG. 5.

Referring to FIG. 1A, system 101 can include at least a processor 102, storage media 104, a network interface system 106 (e.g., supporting a wired communication or wireless communications such as Bluetooth, Wi-Fi, or other near-field communication), a user interface system 108, a VR application 110 stored on the storage media 104, and an operating system 112 stored on the storage media 104. System 101 can include or communicate with one or more sensors 114 (e.g., sensor 114A, sensor 114B, and sensor 114C). System 101 can include or communicate with a mapping resource 116, which can be managed by the awareness module 100. The mapping resource 116 may store a mapping data structure that includes various types of interruption notifications associated with levels of notification and VR application context.

Communication to and from system 101 may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

In some cases, the awareness module 100 (e.g., awareness module 100A) is part of the VR application 110. In some cases, the awareness module 100 (e.g., awareness module 100B) is included as a layer on the operating system 112 as an application. In some cases, the awareness module 100 (e.g., awareness module 100C) is a separate module running on the same or a separate system.

Referring to FIG. 1A and FIG. 1B, awareness module 100 can receive VR application information 150, device input information 155, sensor information 160, and context information 165. The information the awareness module 100 receives may be received through a variety of channels and in a number of ways. The awareness module 100 communicates with the VR application 110, the OS 112, one or more sensors 114, context resources (not shown), such as a social graph, enterprise graph, and user contacts list, or a combination thereof, to obtain the information needed to perform real-world awareness for virtual reality. It should be understood that access to context resources will be based on permissions provided by the user.

VR application information 150 can include detailed information about the application, such as the current state. Device input information 155 can include user input, for example, from input devices such as a VR controller, a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. Device input information 155 can also include information about battery consumption.

Sensor information 160 may be received from one or more sensors 114. The one or more sensors can include, for example, an optical sensor, a position sensor, a gaze detection sensor, a microphone, a biometric sensor, an environmental sensor, or a multiple and/or combination thereof. A more detailed description of potentially available sensors is provided later.

The one or more sensors 114 may be included in or communicate with the computing system 101. For example, in the HMD device described with respect to FIG. 6A, one or more sensors may be included in the HMD device embedded in the headset. In the HMD device described with respect to FIG. 6B, one or more sensors may be included in the HMD device and/or in a mobile device (e.g., removable smart phone) used to support the HMD device.

Context information 165 can include information from local resources or external resources available via the network interface system 106 and can be obtained from a variety of sources. For example, the awareness module may access (when given permission) a social graph, an enterprise graph, or one or more data resources, such as a contact list, that are accessible over the Internet, other networks (private and/or public), or even on a user's local machine.

The VR application 110 can include the awareness module (e.g., awareness module 100A), be aware of the possibility of an awareness module or other application that may want information of state (e.g., by providing APIs), or be closed to communication with outside applications. For the case the VR application 110 provides APIs, the APIs may involve general availability of state information or for when expecting communication with an awareness module, the VR application 110 may provide a level of openness to interruption.

In cases where the awareness module 100 (e.g., awareness module 100A) is included in the VR application 110, the awareness module 100 can receive signals from the VR application 110 for any VR application information 150. In this case, the awareness module 100 may not need to receive device input information 155 to perform its analysis.

In cases where the awareness module 100 (e.g., awareness module 100B) is included as a layer in the OS 112, the awareness module 100 may or may not have access to activities of the VR application 110. In some cases, the VR application 110 is aware of the awareness module and/or has APIs for querying or communicating about what is happening in the VR application 110. In cases where the awareness module 100 has access to the VR application 110, the awareness module 100 may receive signals from the VR application 110. The awareness module 100 may contact the VR application 110 and ask for the current status, for example, application state and other context (which may be available via an API). As another example, the awareness module 100 may ask how interruptible the user currently is (which may be available via an API). In some cases, the VR application 110 has levels understood by both the awareness module 100 and VR application 110 (e.g., interruption level 1, interruption level 2, interruption level intermediate, etc.). In some cases, the request regarding how interruptible the user currently is may be a request for what types of interruptions are available. The VR application 110 may then communicate VR application information 150 to the awareness module 100, such as its current state or level of openness to interruption. For example, the VR application 110 may communicate what is currently happening or whether interruptions are allowed.

In cases where the awareness module 100 (e.g., awareness module 100C) is a separate module, the awareness module 100 may or may not have access to the VR application 110 and the OS 112. In cases where the awareness module 100 has access to the VR application 110, the awareness module 100 may receive signals from the VR application 110. The awareness module 100 may contact the VR application 110 and ask for the current status or openness to interruption. The VR application 110 may then communicate VR application information 150 to the awareness module 100, such as its current state or level of openness to interruption. For example, the VR application 110 may communicate what is currently happening or whether interruptions are allowed.

In cases where the awareness module 100 does not have access to the VR application 110, but has access to the OS 112, the awareness module 100 may receive signals from the OS 112, such as the device input information 155 (that is being used by the VR application 110). The awareness module 100 can analyze the received signals and determine information about the VR application 110. For instance, the awareness module 100 may receive any VR signals the VR application 110 is using in the OS 112. Thus, even though the awareness module 100 does not have access to the VR application 110, the awareness module 100 may be able to see information about the VR application 110, such as the intensity of a user's actions through the device input information 155.

In cases where the awareness module 100 does not have access to both the VR application 110 and the OS 112, the awareness module 100 may only have access to the sensor information 160. Here, the sensor information 160 may or may not be via the same sensors used by the computing system 101. In this case, the awareness module 100 may receive signals from various sensors, such as an optical sensor or a microphone. The awareness module 100 can then analyze the received signals to perform real-world awareness.

Figure 2:
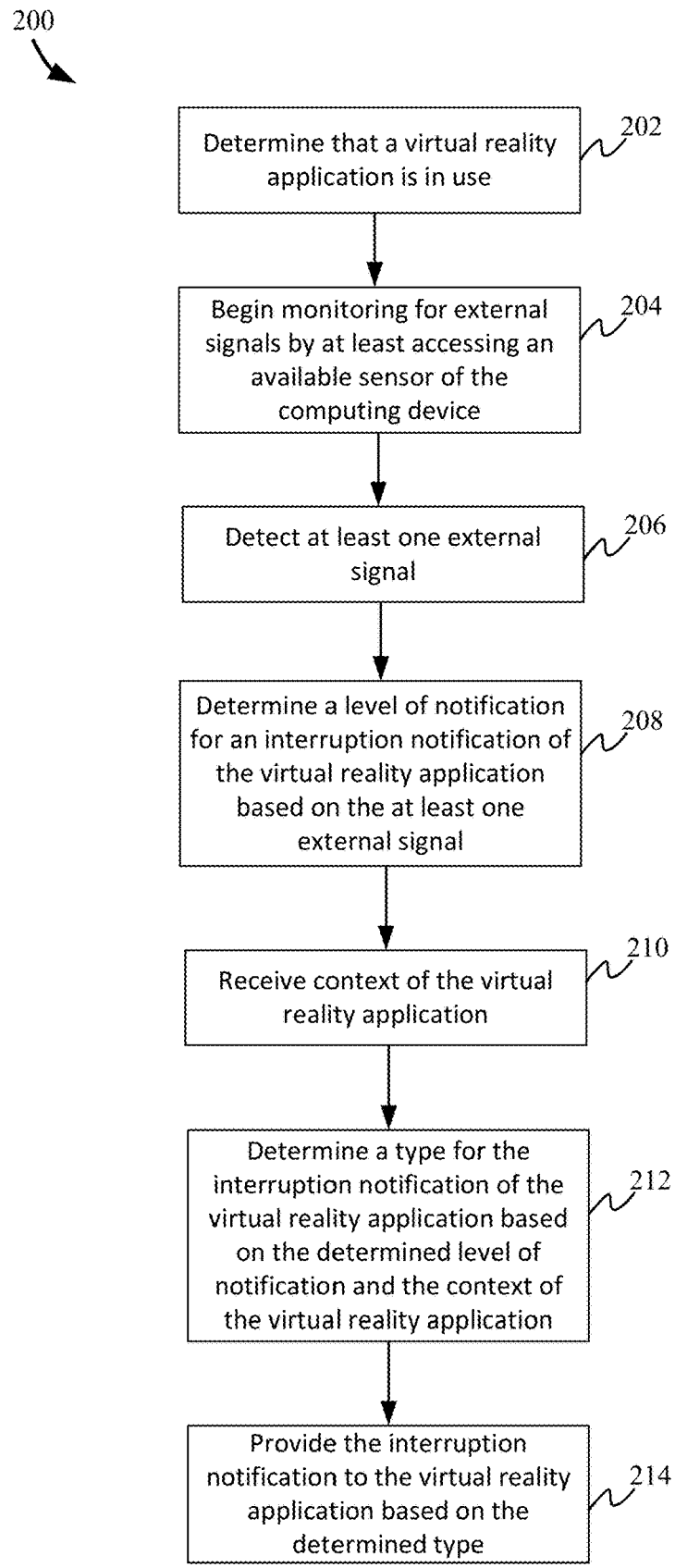
FIG. 2 illustrates an example process flow for performing real-world awareness for virtual reality.

FIG. 2 illustrates an example process flow diagram for performing real-world awareness for virtual reality. Referring to FIG. 2, an awareness module, such as implemented by system 101 as described with respect to FIG. 1A, can perform process 200 for a VR application running on a computing device. The computing device can be any computing device such as, but not limited to, a laptop computer, a desktop computer, a tablet, a personal digital assistant, a smart phone, a smart television, a gaming console, wearable device, headset, and the like. For example, the computing device may be a HMD-based VR device, such as described with respect to FIGS. 6A and 6B.

To begin process 200, the awareness module can determine that a VR application is in use (202). The determination can be made a number of ways. The awareness module can receive one or more signals (e.g., VR application signals, OS signals, or sensor signals) and analyze the received signals to determine that the application is in use.

In one example, the awareness module may receive signals from one or more sensors on the computing device, such as a proximity sensor such as an IR sensor or a contact-based sensor such as a pressure sensor, indicating the user is wearing the headset.

In another example, the awareness module may receive signals from the VR application indicating a user is currently operating the VR application. In yet another example, the awareness module may receive signals from the OS indicating user interaction with the VR application.

In response to determining that the VR application is in use (202), the awareness module can begin monitoring (204) for external signals. The awareness module can monitor for external signals by at least accessing an available sensor of the computing device. The available sensor of the computing device can include, for example, an optical sensor, a position sensor, a gaze detection sensor, a microphone, a biometric sensor, an environmental sensor, or a combination thereof. A more detailed description of each of these sensors is provided later.

As previously described, the computing device may include or communicate with the available sensor. For example, in the HMD device described with respect to FIG. 6A, the available sensor may be included in the HMD device. In the HMD device described with respect to FIG. 6B, the available sensor may be included in the HMD device and/or in a mobile device (e.g., removable smart phone) used to support the HMD device.

Examples of external signals may include, but are not limited to, an audio signal, a video signal, or a combination thereof. The external signals can include information about the real-world, as opposed to a digital signal, such as a received email or phone call. For example, in case where a user is operating a VR application in a coffee shop, the external signals may include a video signal showing any other customer in the coffee shop or an audio signal of the current noise level of the coffee shop. The external signals may also include digital signals or biometric signals from, for example, a personal body monitor or a smart watch.

In some cases, the awareness module may not actually perform the monitoring. In this case, the awareness module may communicate with one or more services that can perform the monitoring. For example, the awareness module may be triggered by an event to start monitoring for external signals. Then, instead of the awareness module performing the monitoring itself, the awareness module can tell another service capable of performing the monitoring to start monitoring for external signals.

In some cases, the awareness module will only monitor for external signals when it determines there is a VR application in use. In other cases, the awareness module may continuously monitor for external signals.

In some cases, the awareness module may be triggered to begin monitoring for external signals for reasons other than determining that the VR application is in use. In one example, the awareness module may have access (upon permission) to a user's location information and may begin monitoring anytime the user is in a public place, such as a library, instead of at home. In another example, the awareness module may have access (upon permission) to a user's calendar. The awareness module can determine that the user has a work meeting with a colleague soon and can start monitoring for external signals to allow for an interruption notification when the colleague arrives. In yet another example, the awareness module may have access to a user's smart watch. The awareness module can determine that the user is having a health issue, such as a rise in heart rate, and can start monitoring for external signals.

While monitoring (204) for the external signals, the awareness module may detect (206) at least one external signal (in any combination of described external signals). As previously described, the at least one external signal may include an audio signal or a video signal.

The external signals may also include digital signals. In some cases, the awareness module may receive digital signals about weather information or news information. For example, the awareness module may receive a news alert about a robbery in the user's area. In another example, the awareness module may receive a weather alert about severe weather in the user's area.

In response to detecting (206) the at least one external signal, the awareness module may determine (208) a level of notification for an interruption notification of the VR application based on the at least one external signal.

The awareness module may determine the level of notification for the interruption notification by applying a signal analysis to the at least one external signal. The awareness module can assign a notification value to a result of the signal analysis. Any result of the signal analysis may be a potential interruption and a notification value can be assigned to each of these potential interruptions (e.g., results). For each result with a notification value that meets a threshold value, the awareness module can map the notification value to an appropriate level of notification. The appropriate level of notification can be the determined level of notification for the interruption notification.

There may be a spectrum of information about the real-world that can have different degrees of importance and urgency. The awareness module may be continuously detecting audio signals and video signals and analyzing the signals to determine if the notification values of the signals meet the threshold level.

The signal analysis can include performing an analysis to identify different aspects of the at least one signal. The signal analysis for an audio signal can include, for example, identifying the volume level of the audio, identifying what words were spoken and/or who spoke those words. For example, the audio signal analysis may identify that a keyword was spoken, such as the name of the user of the VR application or the words "excuse me" or "help." The audio signal analysis may also identify that the noise level in a particular room rose quickly. The audio signal analysis can be completed, for example, by performing a voice recognition analysis, performing a speech-to-text analysis, or performing a sound analysis. In some cases, the analysis is performed locally. In some cases, the analysis is carried out by communication with various services available over the Internet/network.

The signal analysis for a video signal can include, for example, identifying a movement level or light level of the video and identifying one or more people or objects. For example, the audio signal analysis may identify that a person is holding a gun, or, in a case where everyone in the room starts rushing out, that there is a high level of movement. The video signal analysis can be completed, for example, by performing a facial recognition analysis or object recognition analysis on the video signal or performing a movement analysis or light analysis. In some cases, the analysis is performed locally. In some cases, the analysis is carried out by communication with various services available over the Internet/network.

In some cases, the awareness module may detect the at least one external signal and then send the detected external signal to a separate service to perform the analysis. For example, the awareness module may detect an audio signal and then send the detected audio signal to a speech-to-text service to have a speech-to-text analysis performed. The speech-to-text service may then return the results of the analysis to the awareness module.

Once the signal analysis is performed, the notification value can be assigned to the result. The notification value can be based on the importance and/or urgency of the result. Results that are more important or more urgent will have a higher notification value than less important or less urgent results.

In an example where the signal analysis includes performing a sound analysis on an audio signal to identify a sound level in the audio signal, the notification value can be assigned based on the identified sound level. If the sound level is determined to be low (e.g., ambient noise), the assigned notification value will be low. If the sound level is determined to be high, such as a loud noise (e.g., a gunshot or the sound of an object crashing to the floor) or one or more people shouting, the assigned notification value will be higher. The real-world awareness process can allow for the sound level can be continuously monitored and provide an interruption notification for any sudden changes, such as a loud noise or shouting.

In an example where the signal analysis includes performing a movement analysis on a video signal to identify a movement level in the video signal, the notification value can be assigned based on the identified movement level. If the movement level is determined to be low, such as most people around the user sitting at tables or walking, the assigned notification value will be low. If the movement level is determined to be high, such as multiple people in a particular room running, the assigned notification value will be higher. The real-world awareness process can allow for the movement level can be continuously monitored and provide an interruption notification for any sudden changes, such as a sudden high amount of movement.

In an example where the signal analysis includes performing an object recognition analysis on a video signal to identify any objects in the video signal, the notification value can be assigned based on the identified objects. If the object is determined to be important, such as a person walks in with a gun, the assigned notification value will be higher than if the object is determined to be a common object. The real-world awareness process can allow for objects to be continuously monitored and provide an interruption notification for any predetermined objects of interest, such as a gun.

In some cases, the signal analysis can also include obtaining and using user context information to help determine what information is important and/or urgent to the user, and thus what notification value to assign. In this case, the signal analysis can be performed as described above. The awareness module can obtain user context information and can use the obtained user context information to help determine how important and/or urgent the results of the signal analysis are to the user.

The awareness module may obtain the user context information in a variety of ways. The awareness module may access a social graph, an enterprise graph, or one or more data resources, such as a contact list, that are accessible over the Internet, other networks (private and/or public), or even on a user's local machine.

In an example where the at least one external signal is a video signal, the awareness module may perform facial recognition on the video signal to identify one or more people in the video. The awareness module can obtain user context information, such as contact information of the user of the VR application. Based on the obtained user context information, the awareness module can determine whether each of the one or more identified people from the video signal is a person of interest to the user. For example, the system may compare the results of the facial recognition to the user's friends list (e.g., from a social graph), the user's contact list (e.g., email contacts, phonebook, enterprise graph), or even a curated list set up by the user or another party to indicate the people of interest.

In one example where the at least one external signal is an audio signal, the awareness module may perform voice recognition on the audio signal to identify one or more people in the audio signal. The awareness module can obtain user context information, such as contact information of the user of the VR application. Based on the obtained user context information, the awareness module can determine whether each of the one or more identified people from the audio signal is a person of interest to the user.

In another example where the at least one external signal is an audio signal, the awareness module may perform a speech-to-text analysis on the audio signal to identify one or more words spoken in the audio signal. The awareness module can obtain user context information, such as contact information of the user of the VR application, or a list of keywords. The keywords may be defined by the user or a default list. Based on the obtained user context information, the awareness module can determine whether each of the one or more identified words from the audio signal is important to the user, such as the name of a contact of the user or one of the keywords.

In some cases, the awareness module may access a social graph of the user to help determine the relationship an identified person has with the user.

The awareness module can assign the notification value based on whether each of the identified people are determined to be a person of interest to the user and the relationship of the identified person to the user. A person with a close relationship to the user, such as a spouse or a boss, are likely to be more important to a user than a person that does not have a close relationship. Therefore, a person with a close relationship to the user is assigned a higher notification value.

In some cases, a result may be assigned a notification value and the awareness module may then adjust the notification value based on the obtained user context information. It should be understood that multiple types of analyses may be performed on each of the external signals.

The awareness module can receive (210) context of the VR application. The context of the VR application can include, for example, a variety of settings information, such as, but not limited to, a privacy level set by the user of the VR application, what the user is currently working on, what information is currently being detected, the current location of the user, or the current time.

Examples of information used to determine the level of openness a user is to interruption can include, for example, whether the user giving a live presentation/phone call, whether the user has set a "do not disturb" preference, whether the user is in a home/shell type experience versus deeply into an immersive experience, what is scheduled on the user's calendar, and whether the user is active versus stationary.

The context of the VR application can be obtained a number of ways. In one case, the context is obtained directly via API with VR application. In one case, the awareness module can detect user inputs to the VR application. In one case, the awareness module may access a social graph, an enterprise graph, or one or more data resources, such as a contact list, that are accessible over the Internet, other networks (private and/or public), or even on a user's local machine to obtain context of the VR application. For example, the awareness module may access an enterprise graph to help determine the importance of a project the user is currently working on. In another example, the awareness module can access a calendar of the user and an enterprise graph to determine if the user is currently in a meeting and how important a meeting is.

The context of the VR application can be analyzed to determine, for example, the type of VR application (e.g., media, gaming, etc.), a level of importance of a current activity, or a level of productivity or immersion. This context information can be used to determine how open the user of the VR application is likely to be to interruption.

In one case, the type of VR application can be used to determine how open the user of the VR application is to interruption. For example, if the VR application is a video game with high-intensity actions being performed, the user may be less open to interruption than if the VR application is a media application with low-intensity actions being performed, such as reading a book or watching a movie. In some cases, type of VR application and the user's actions can be analyzed to determine the intensity of the actions being performed. For example, if the user input signals include a lot of selecting a button, then the VR application may be determined to be a high-intensity application.

In some cases where the VR application is determined to be a low-intensity application, the awareness module can also use context information about where the user is in the VR application to determine how open the user is to interruption. In an example where the user is watching a movie, the awareness module can determine that the user is at the climax of the movie and is less open to interruption.

In one case, the awareness module can analyze the context information obtained from accessing the graphs and/or data resources to determine a level of importance for a current activity. In an example, the awareness module may access a user's calendar to determine the importance of a meeting the user is currently attending. In another example, the awareness module may access the one or more data resources to determine the importance of the user's current location. In yet another example, the awareness module may access an enterprise graph to determine the importance of a project the user is currently working on.

The awareness module may also analyze the obtained context information to determine the user's level of productivity or immersion. In one example, the user may be connected to a virtual conference call, such as a MICROSOFT SKYPE, GOOGLE HANGOUTS, CISCO WEBEX, or AMAZON CHIME conference call, and may be less open to interruption. In another example, the awareness module may determine that a user is in a highly productive state and less open to interruptions because the user has been adding content to a word document for an extended period of time. In yet another example, the awareness module may determine that a user is in a highly immersive state and may be less open to interruptions because the user has a presentation maximized or is watching a video in full-screen. The awareness module can determine the presentation is maximized or the video is being watched in full-screen, for example, by receiving a signal from the OS that a full-screen API is being utilized.

The awareness module can determine (212) a type for the interruption notification of the VR application based on the determined level of notification and the context of the VR application. The interruption notification may be provided (214) to the VR application based on the determined type. The awareness module can determine the type for the interruption notification, for example, by accessing a mapping resource to identify the type of interruption notification associated with the determined level of notification and the context of the virtual reality application.

The mapping resource may store a mapping data structure that includes various types of interruption notifications associated with levels of notification and VR application context. The level of notification and VR application context may be mapped to a type of interruption notification a variety of ways. In one case, the level of notification may indicate an initial type of interruption notification and the context of the VR application can indicate the degree of "loudness" or intensity of the interruption notification. In one case, the level of notification can indicate what the interruption notification will display and the context of the VR application can indicate where the interruption notification will be displayed. For example, the awareness module can match the determined level of openness a user is to interruption to how "loud" to make the interruption to determine the type of interruption notification to provide.

The interruption notification can vary in form and "loudness" or intensity. Several different types of interruption notifications may be provided, such as, but not limited to, a still image, a live video, an activity indicator, or an abstract representation. The live video can include audio. The activity indicator may be a dot or pulse at the edge of a user's field of view. The abstract representation can include, for example, a volume or activity indicator, an indicator of a number of people in the user's field of view, or even display the names of the people in the field of view based on facial recognition, voice recognition, or a device fingerprint.

The type of interruption notification may vary in degree of "loudness" or intensity. The degrees of "loudness" or intensity may include, but is not limited to, the size of an image, video, or representation, the position of an image, video, or representation (e.g., an edge or a corner), the transparency of an image, video, or representation, with or without audio, just an activity indicator, or just an abstract representation. In some cases, where animation or motion is part of the interruption notification, the "loudness" or intensity may include, but is not limited to, speed, frequency, and movement through the view space (e.g., amount of area or locations within the viewing area that the motion or animation covers during its path).

In some cases where the user is immersed in a three-dimensional environment, the awareness module can use distance or real-world size to determine the type of interruption notification. For example, the interruption notification can be displayed on a table in front of the user or blended into a distant wall.

Examples of interruption notifications can include a full-size video screen, a still image that is 50% transparent, a still image that is positioned at the top corner of the field of view. For example, if the interruption seems important and the user is not in a highly immersed experience, a "loud" version of an interruption notification may be provided, such as a large popover video with audio in the center of the user's field of view. If the user has set a "Do Not Disturb"

preference, no interruption notification, or a very subtle interruption notification, would be provided. It should be understood that the examples of interruption notifications provided herein are included for the purpose of example and are not intended to be limiting in any manner, as any other suitable interruption notification and/or combination of interruption notifications may be utilized.

The type and/or degree of "loudness" can be pre-set or user selected. In some cases, the type and/or degree of "loudness" is based on user preferences. For example, user intervention can adjust the "loudness" of the interruption notification up or down from its initial state.

FIG. 3 illustrates an example mapping data structure used to map the type of interruption notification. Referring to FIG. 3, a simplified version of a mapping data structure is shown. The mapping structure can be managed by the awareness module. In the illustrated scenario of FIG. 3, three levels of notification and four types of virtual reality context is shown. The type of the interruption notification may be identified by mapping the associated level of notification and the context of the VR application.

In this scenario, if the determined level of notification is "2" and the context of the VR application is that the user is operating a low-intensity VR application, then the type of notification provided to the user is a still image displayed at the center of the field of view. In another example, if the determined level of notification is "3" and the context of the VR application is that the user is operating a high-intensity VR application, then the type of notification provided to the user is a still image with 50% transparency displayed at the edge of the field of view. Categories of applications considered low-intensity and high-intensity may be based on a list (that may be associated with the mapping) of application types (e.g., media application, productivity application, gaming application, etc.) and/or action/state of the virtual reality application.

Returning to FIG. 2, the interruption notification may be provided (214) to the VR application based on the determined type.

In some cases, when the interruption notification is provided to the VR application, a pause command may be sent to the VR application. For example, if the interruption notification is a full-screen notification and the user's view of the VR application is blocked, the awareness module may also send a pause command.

In some cases, instead of providing the interruption notification to the VR application based on the determined type, the awareness module may send the VR application a message that there is an interruption and the level of that interruption. The VR application can then determine how to incorporate the interruption into the VR application.

In some cases, the functionality may include a manual interruption, such as a user-initiated interruption. For example, the user may be at a point between tasks, or just curious, and decide to manually initiate a peek into the real world.

Figure 4A:
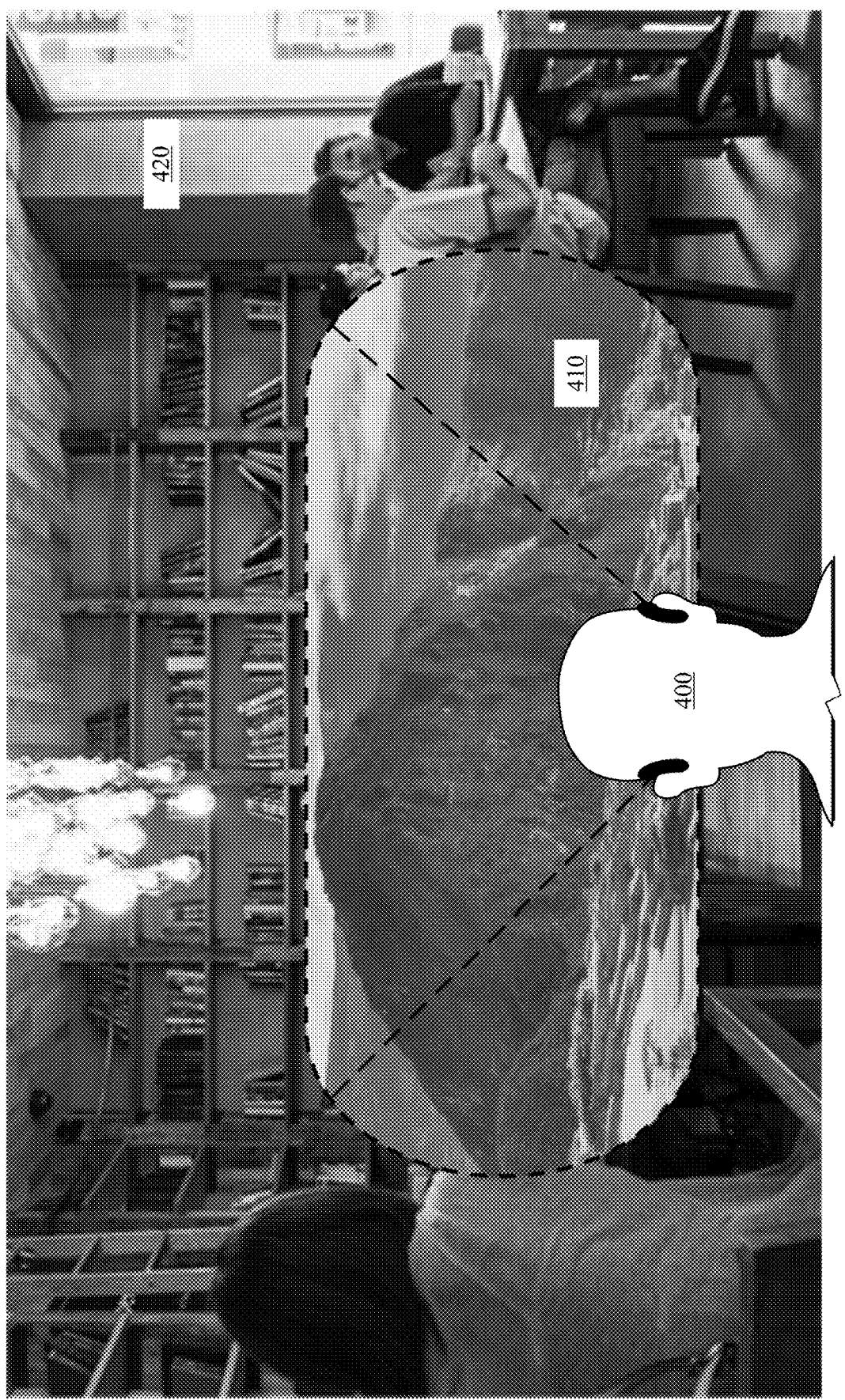
FIGS. 4A-4D illustrate an example scenario of real-world awareness for virtual reality.

FIGS. 4A-4D illustrate an example scenario of real-world awareness in virtual reality. Referring to FIG. 4A, a user 400 may run a VR application on a computing device such as the VR devices described with respect to FIGS. 6A and 6B. In the illustrated scenario, the user 400 is exploring Machu Picchu through a VR device while sitting in a coffee shop. The user's VR device field of view 410 is a simulated environment of Machu Picchu and the user's external environment 420 is the coffee shop.

Since the user is fully immersed in the VR environment, the user may want to be provided with real-world awareness. To provide the real-world awareness, an awareness module may determine that the VR application is in use and begin monitoring for external signals.

Figure 4B:
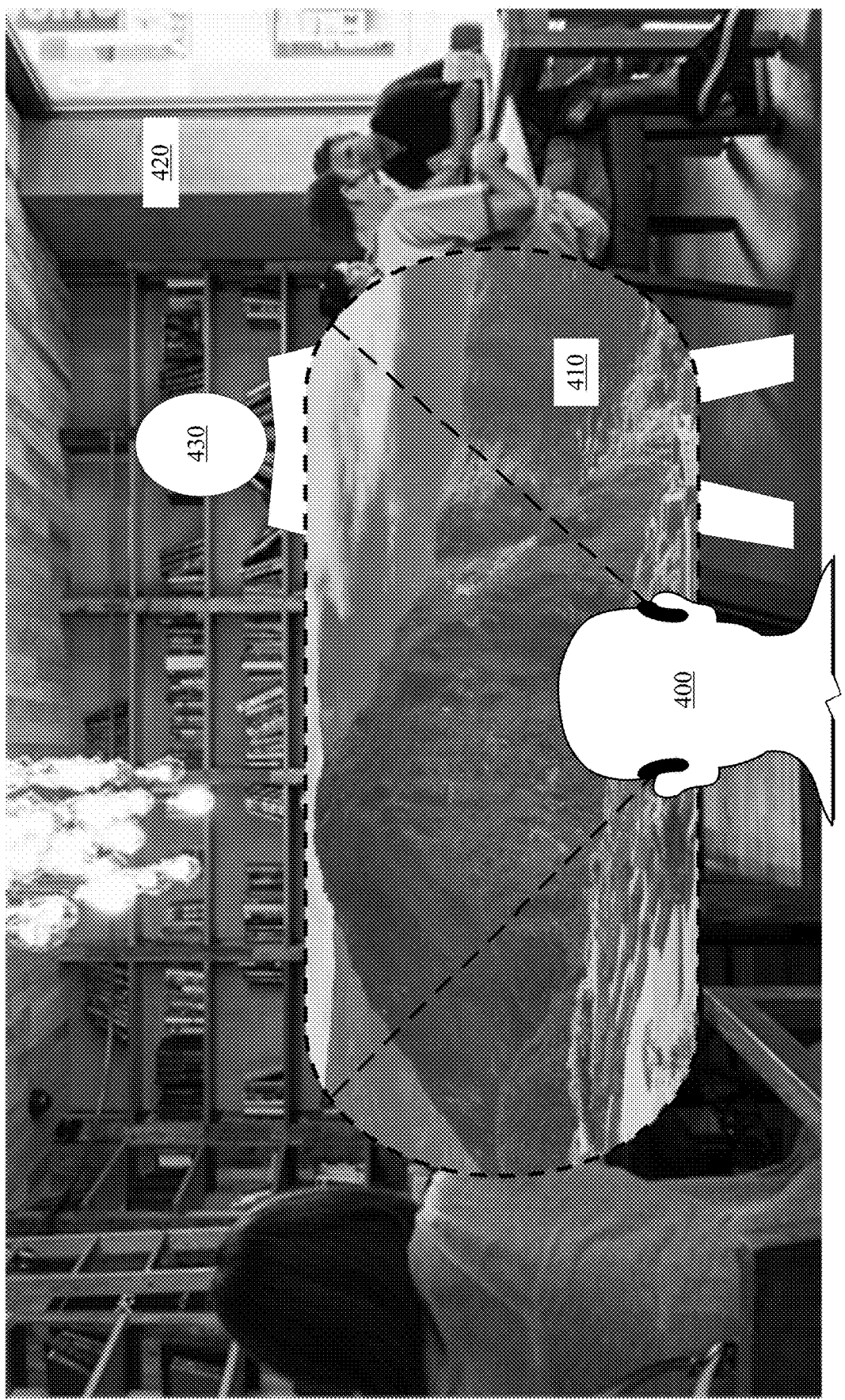

Referring to FIG. 4B, a person 430 may walk into the coffee shop. In this scenario, since the user is immersed in the VR application, the person 430 is shown in only the user's external environment 420 and not the user's field of view 410.

The awareness module may detect that the person 430 has entered the coffee shop and can determine a level of notification to provide the user 400 based on the detected person. The awareness module may detect that the person 430 entered the coffee shop by receiving either a video signal or an audio signal. The awareness module may perform a signal analysis on the received audio or video signal to determine a level of notification corresponding to detecting the person 430 in the external environment. For example, the awareness module may perform a signal analysis on the video signal, (through facial recognition and obtaining user context information) to determine that the person 430 is a colleague named "John Doe".

The awareness module may also receive context of the VR application and determine a type of interruption notification to provide the user 400 based on the level of notification and the context of the VR application. For example, the awareness module may determine that the user 400 is waiting to meet the person 430 for an important meeting (e.g., by accessing the calendar of user 100 or other source of meeting information that the access module is given access to by the user 100).

Figure 4C:
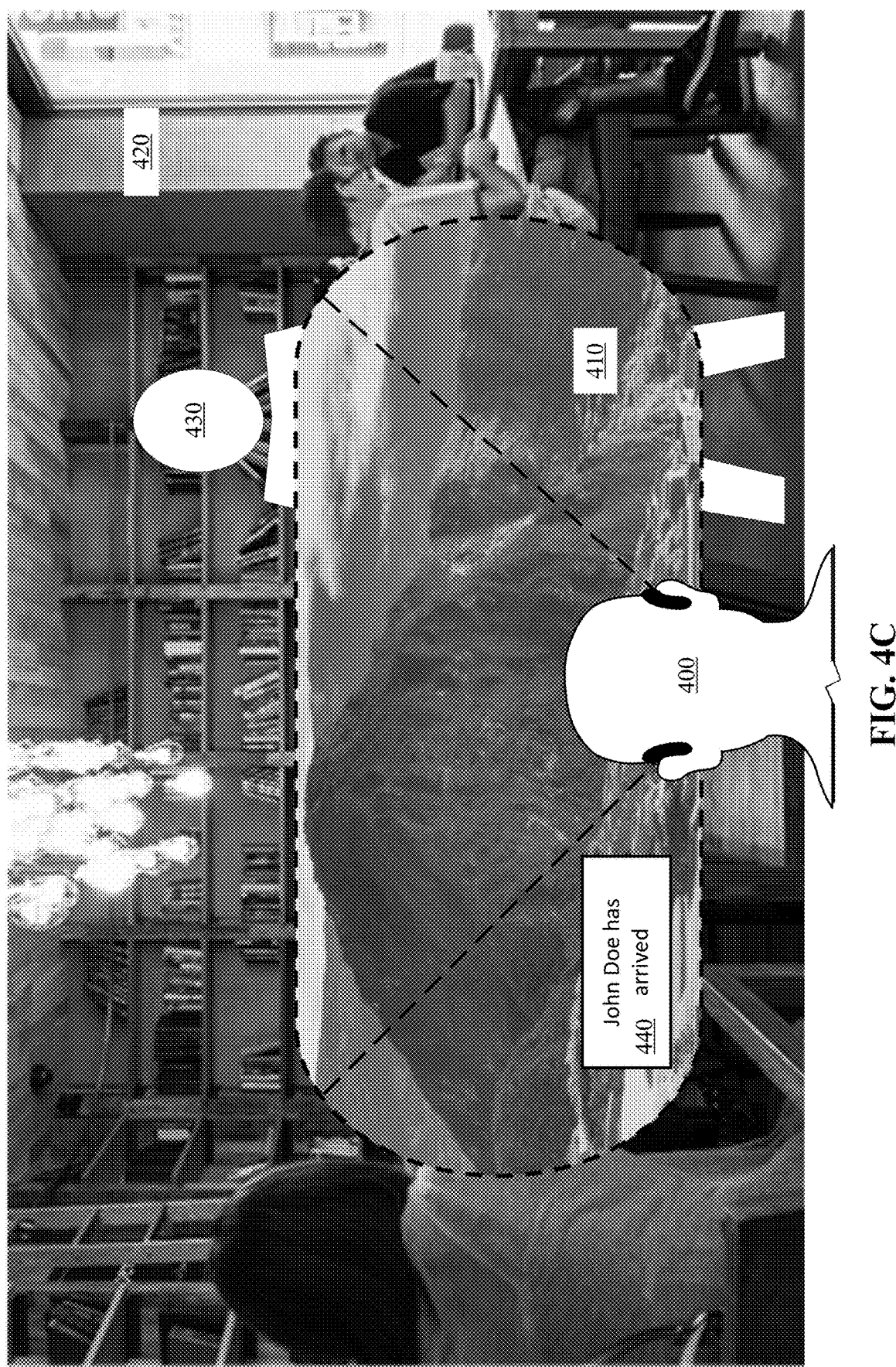

Referring to FIG. 4C, an example interruption notification is provided to the user 400 though the user's field of view 410. In the illustrated scenario, an abstract representation 440 is provided to the user 400 in the lower corner of the field of view 410. The abstract representation 440 displays a message "John Doe has arrived" to notify the user 400 that the person 430 has arrived.

Figure 4D:
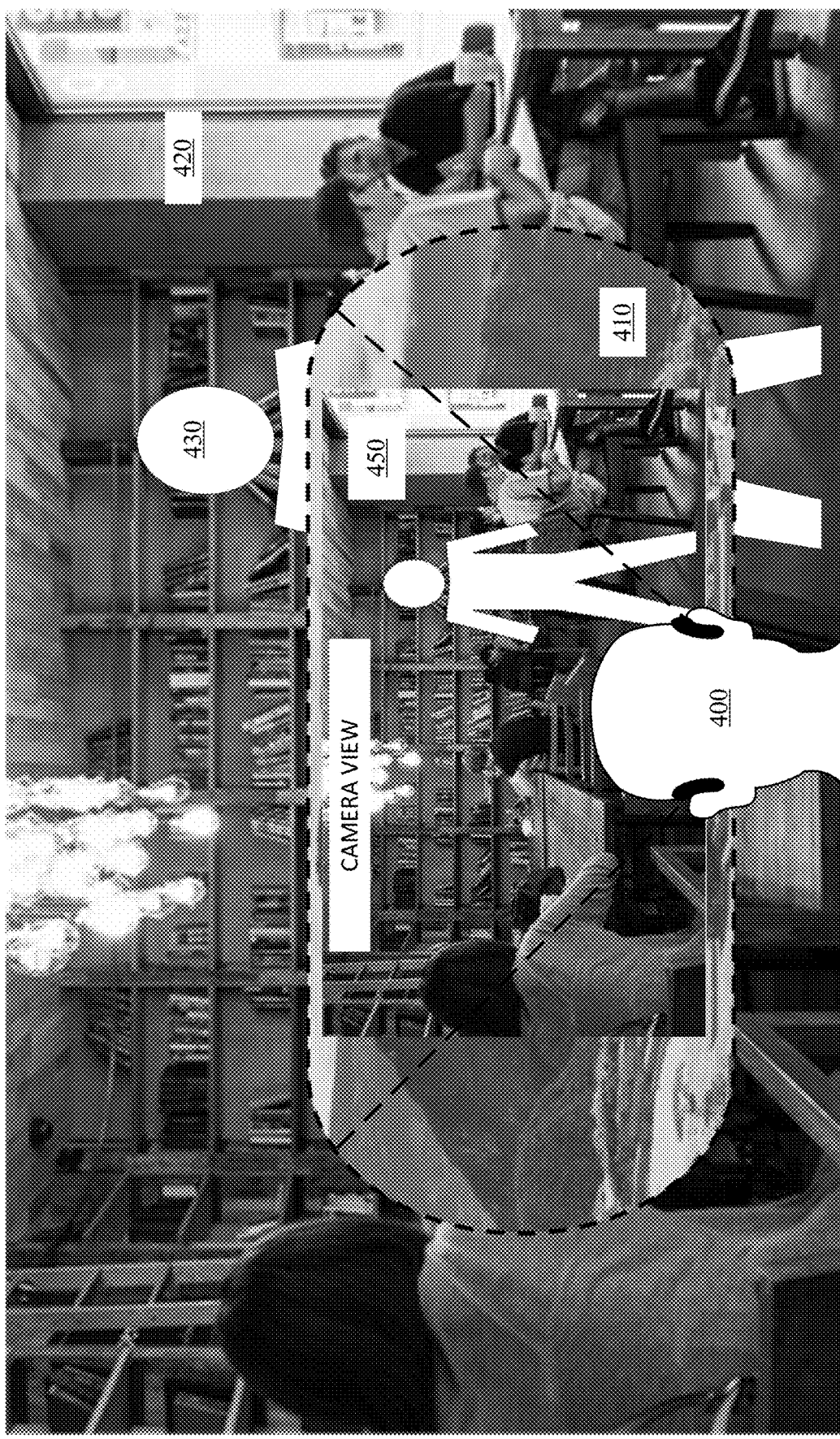

Referring to FIG. 4D, an example interruption notification is provided to the user 400 though the user's field of view 410. In the illustrated scenario, a live video 450 is provided to the user 400 in the center of the field of view 410. The live video 440 streams a camera view of the external environment 420 to notify the user 400 that the person 430 has arrived. In this case, the user 400 is provided a "peek" of the external environment 420 without removing the VR device.

Figure 5:
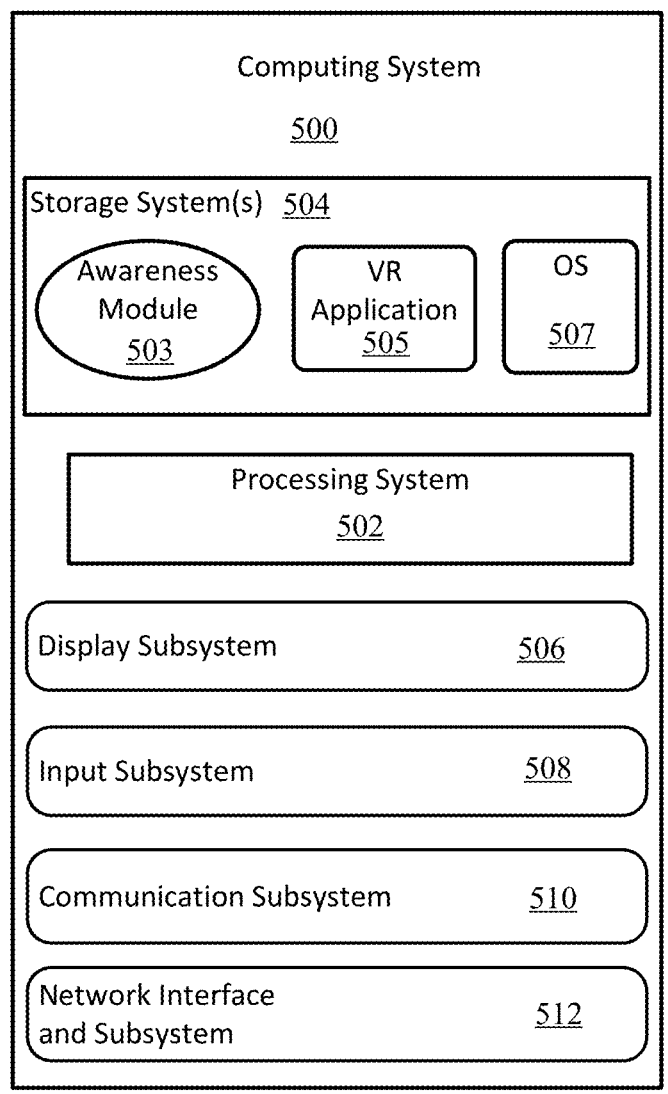
FIG. 5 an example computing system of a VR device. illustrate example configurations of a VR device.

FIG. 5 illustrates an example computing system of a VR device; and FIGS. 6A and 6B illustrate example head-mounted display-based VR devices that may be used in certain implementations described herein. The illustrated VR devices are wearable computing devices. Wearable computing devices with near-eye displays may also be referred to as "head-mountable displays", "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Referring to FIG. 5, a computing system 500 of a VR device can include a processing system 502, storage system 504 storing VR application 505 (e.g., VR application 110 as described with respect to FIG. 1A) and awareness module 503 (e.g., awareness module 100 as described with respect to FIGS. 1A and 1B), including instructions for processes 200, display subsystem 506, input subsystem 508, communication subsystem 510, and network interface and subsystem 512 (described in more detail below). Depending on implementation, more or fewer of these systems may be included. Referring to FIGS. 6A and 6B, a head-mounted display (HMD) can be worn by a user and can generate graphics, such as a view of a virtual space, in a display portion of the HMD. The graphics presented on a head-mounted display can cover a large portion or even all of a user's field of view, providing an immersive experience to the user.

FIGS. 6A and 6B illustrate example configurations of a VR device. Referring to FIG. 6A, a VR device 600 may provide an immersive experience and be in the form of a mask. Referring to FIG. 6B, a VR device 620 can include a slot or holder for receiving a smartphone; and include clips or other means for securing the smartphone to the headset. The VR device can include straps or other structure to secure or attach the VR device to a user's head. The screen of the smartphone would thus be viewable to the user much in the same way as a conventional HMD has an integrated screen. The smartphone can be leveraged to support the VR applications and provide any of the computing elements described with respect to FIG. 5.

The HMD devices 600 and 620 can include an optical sensor system (not shown) that may include one or more optical sensors. In one example, the optical sensor system can include one or more outward facing optical sensors that may be configured to acquire and detect the real-world background and/or physical space from a similar vantage point (e.g., line of sight) as observed by the user through the lenses. The optical sensor system may include a variety of sensors, such as one or both of a depth camera/sensor and an RGB camera/sensor. In some cases, a high definition camera or other resolutions for image sensing may be used.

The sensors included with the HMD devices 600 and 620 can support various functionalities including head tracking to determine the 3D (three-dimensional) position and orientation of the user's head within the physical real-world space; and gaze tracking to ascertain a direction of the user's gaze.

For example, the HMD devices 600 and 620 can include a position sensor system (not shown) that may include one or more position sensors such as accelerometer(s), gyroscope(s), magnetometer(s), global positioning system(s) (GPS), multilateration tracker(s) (not shown), and/or other sensors that output position sensor information useable as a position, orientation, and/or movement of the relevant sensor.

When position sensor system includes one or more motion sensors (e.g., inertial, multi-axis gyroscopic or acceleration sensors), movement and position/orientation/pose of a user's head may be detected when the user is wearing the system.

The HMD devices 600 and 620 may further include a gaze detection subsystem (not shown) configured for detecting a direction of gaze of each eye of a user or a direction or location of focus. Gaze detection subsystem may be configured to determine gaze directions of each of a user's eyes in any suitable manner. For example, in the illustrative example shown, a gaze detection subsystem includes one or more glint sources, such as infrared light sources, that are configured to cause a glint of light to reflect from each eyeball of a user, and one or more image sensors, such as inward-facing sensors, that are configured to capture an image of each eyeball of the user. Changes in the glints from the user's eyeballs and/or a location of a user's pupil, as determined from image data gathered using the image sensor(s), may be used to determine a direction of gaze.

In addition, a location at which gaze lines projected from the user's eyes intersect the external display may be used to determine an object at which the user is gazing (e.g. a displayed virtual object and/or real background object). Gaze detection subsystem may have any suitable number and arrangement of light sources and image sensors. In some implementations, the gaze detection subsystem may be omitted.

The HMD devices 600 and 620 may include one or more microphones (not shown) configured to detect sounds, such as voice commands from a user.

Position sensor system (including motion sensors), as well as microphone(s) and gaze detection subsystem, also may be employed as user input devices, such that a user may interact with the HMD devices 600 and 620 via gestures of the eye, neck and/or head, as well as via verbal commands in some cases. These systems are represented as input subsystem 508 in FIG. 5.

The HMD devices 600 and 620 can be configured with one or more audio transducers (e.g., speakers, earphones, etc.) (not shown) so that audio can be utilized as part of the user experience.

The HMD devices 600 and 620 can further include a controller (not shown), which includes components described with respect to computing system 500, such as processing system 502 and storage system 504. Controller can be in communication with the sensors, gaze detection subsystem, lenses, and/or other components through, for example, a communications subsystem 510. The communications subsystem 510 can operate with a network interface and subsystem 512 to facilitate the display system being operated in conjunction with remotely located resources, such as processing, storage, power, data, and services. That is, in some implementations, an HMD device can be operated as part of a system that can distribute resources and capabilities among different components and subsystems.

The HMD devices 600 and 620 may include instructions stored on the storage system 504 for image production that direct the HMD devices 600 and 620 to display virtual objects to the user, which are visually superimposed onto the physical environment so as to be perceived at various depths and locations. The HMD devices 600 and 620 may use stereoscopy to visually place a virtual object at a desired depth by displaying separate images of the virtual object to both of the user's eyes. To achieve the perception of depth, the instructions for image product may render the two images of the virtual object at a rendering focal plane of the HMD devices 600 and 620, such that there is a binocular disparity between the relative positions of the virtual object in the two images. For example, this binocular disparity may be a horizontal disparity where the relative positions of the virtual object in the two images is separated by a distance in the x axis direction. Here, the x axis may be defined as the axis extending to the left and the right relative to the user, the y axis extending upward and downward relative to the user, and the z axis extending forward and backward relative to the user.

The horizontal disparity between the relative positions of the virtual object in the two images will cause the user to perceive that the virtual object is located at a certain depth within the viewed physical environment due to stereopsis. Using this stereoscopy technique, the HMD devices 600 and 620 may control the displayed images of the virtual objects, such that the user will perceive that the virtual objects exist at a desired depth and location in the viewed physical environment.

Optical sensor information received from the optical sensor system and/or position sensor information received from position sensor system may be used to assess a position and orientation of the vantage point of the at least partially see-through stereoscopic display relative to other environmental objects. In some embodiments, the position and orientation of the vantage point may be characterized with six degrees of freedom (e.g., world-space X, Y, Z, pitch, roll, and yaw). The vantage point may be characterized globally or independent of the real-world background. The position and/or orientation may be determined with an on-board computing system (e.g., controller) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects in the virtual space and add additional virtual objects to be displayed to the user at a desired depth and location within the virtual world.

When the position sensor system includes GPS (not shown), the system can use the GPS to determine a location of the HMD devices 600 and 620. This may help to identify real world objects, such as buildings, etc. that may be located in the user's adjoining physical environment.

A power management subsystem (not shown) may include one or more batteries and/or protection circuit modules (PCMs) and an associated charger interface and/or remote power interface for supplying power to components in the HMD devices 600 and 620.

It may be understood that sensors illustrated in, and described with respect to, FIGS. 6A and 6B are included for the purpose of example and are not intended to be limiting in any manner, as any other suitable sensors and/or combination of sensors may be utilized to meet the needs of a particular implementation of a head-mounted VR device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

It is to be understood that the VR devices may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

As mentioned above, computing system 500 can implement a VR device, including, but not limited to HMD devices 600 and 620.

Processing system 502 processor 102 as described with respect to FIG. 1A) may include one or more physical processors (hardware) configured to execute software instructions. Additionally or alternatively, the logic processor may include one or more hardware logic circuits or firmware devices configured to execute hardware-implemented logic or firmware instructions. Processors of the processing system 502 may be single-core or multi-core, and the instructions executed thereon may be configured for sequential, parallel, and/or distributed processing. Individual components of the processing system 502 optionally may be distributed among two or more separate devices, which may be remotely located and/or configured for coordinated processing. Aspects of the processing system 502 may be virtualized and executed by remotely accessible, networked computing devices configured in a cloud-computing configuration. In such a case, these virtualized aspects are run on different physical logic processors of various different machines, it will be understood.

Processing system 502 includes one or more physical devices configured to execute instructions. The processing system 502 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result. When the instructions are software based (as opposed to hardware-based such as implemented in a field programmable gate array (FPGA) or digital logic), the instructions can be stored as software 505 in the storage system 504.

Storage system 504 (e.g., storage media 104 as described with respect to FIG. 1A) may include physical devices that are removable and/or built-in. Storage system 504 can include one or more volatile and non-volatile storage devices such as optical memory (e.g., CD, DVD, HD-DVD, Blu-Ray Disc, etc.), semiconductor memory (e.g., RAM, SRAM, DRAM, ROM, EPROM, EEPROM, FLASH memory, etc.), and/or magnetic memory (e.g., hard-disk drive, floppy-disk drive, tape drive, MRAM, etc.), or other mass storage device technology. Storage system 504 may include dynamic, static, read/write, read-only, random-access, sequential-access, location-addressable, file-addressable, and/or content-addressable devices. It should be understood that a storage device or a storage medium of the storage system includes one or more physical devices and excludes propagating signals per se.

The storage system 504 can include an operating system 507 (e.g., OS 112 as described with respect to FIG. 1A). Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 5, can be thought of as additional, nested groupings within the operating system space, each containing an OS, application programs, and APIs.

Aspects of processing system 502 and storage system 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage system 504. This visual representation may take the form of a graphical user interface (GUI). As the herein described methods and processes change the data held by the storage system, and thus transform the state of the storage system, the state of display subsystem 506 may likewise be transformed to visually represent changes in the underlying data. Display subsystem 506 may include one or more display devices utilizing virtually any type of technology. Such display devices may be combined with processing system 502 and/or storage system 504 in a shared enclosure, or such display devices may be peripheral display devices. For VR device 600, the display subsystem 506 may be part of the headset. For VR device 620, the display subsystem 506 may be part of the removable mobile device.

When included, input subsystem 508 (e.g., user interface system 108 of FIG. 1A) may include or interface with peripherals or input devices such as an input controller, keyboard, or mouse. Input subsystem 508 may include or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; any of the sensors described above with respect to FIGS. 6A and 6B and/or any other suitable sensor.

When included, network interface and subsystem 512 (e.g., network interface system 106 of FIG. 1A) may be configured to communicatively couple computing system 500 with one or more other computing devices. Network interface and subsystem 512 may include wired and/or wireless communication devices compatible with one or more different communication protocols. As non-limiting examples, the network interface and subsystem 512 may be configured for communication via a wireless telephone network, or a wired or wireless, near-field, local- or wide-area network. In some embodiments, the network interface and subsystem 512 may allow computing system 500 to send and/or receive messages to and/or from other devices via a network such as the Internet.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   determining that a virtual reality application is in use;
   in response to determining that the virtual reality application is in use, monitoring for external signals by at least accessing an available sensor of a computing device;
   detecting at least one external signal while monitoring for the external signals;
   in response to detecting the at least one external signal, determining a level of notification for an interruption notification of the virtual reality application based on the at least one external signal;
   receiving context of the virtual reality application;
   after determining the level of notification and receiving the context, determining a type for the interruption notification of the virtual reality application based on both the determined level of notification and the context of the virtual reality application, wherein the type for the interruption notification comprises a degree of transparency of the interruption notification; and
   providing the interruption notification to the virtual reality application based on the determined type.

2. The method of claim 1, wherein the at least one external signal comprises at least one of an audio signal or a video signal.

3. The method of claim 1, wherein the determining of the type for the interruption notification of the virtual reality application comprises:
   accessing a mapping resource storing a mapping data structure to identify the type associated with the determined level of notification and the context of the virtual reality application.

4. The method of claim 1, wherein the receiving of the context of the virtual reality application comprises:
   detecting user input signals to the virtual reality application or accessing a graph structure.

5. The method of claim 1, wherein the determining of the level of notification for the interruption notification of the virtual reality application comprises:
   from the at least one external signal, applying a signal analysis;
   assigning a notification value to a result of the signal analysis; and
   for each result with a notification value that meets a threshold value, mapping the notification value to an appropriate level of notification, the appropriate level being the level of notification for the interruption notification.

6. The method of claim 5, wherein the at least one external signal is a video signal and applying the signal analysis comprises:
   performing facial recognition on the video signal to identify one or more people in the video signal;
   obtaining user context information, wherein the user context information comprises contact information of the user of the virtual reality application; and
   determining whether each of the one or more identified people is a person of interest to the user based on the obtained contact information; and
   wherein assigning the notification value to the result of the signal analysis comprises:
      assigning the notification value based on whether each of the one or more people are determined to be the person of interest and a relationship to the user.

7. The method of claim 5, wherein the at least one external signal is an audio signal and applying the signal analysis comprises:
   performing voice recognition on the audio signal to identify one or more people in the audio signal;
   obtaining user context information, wherein the user context information comprises user contact information of the user of the virtual reality application; and
   determining whether each of the one or more identified people is a person of interest to the user based on the obtained contact information; and
   wherein assigning the notification value to the result of the signal analysis comprises:

assigning the notification value based on whether each of the one or more people are determined to be the person of interest and a relationship to the user.

8. The method of claim 5, wherein the at least one external signal is a video signal and applying the signal analysis comprises performing a movement analyses on the video signal to identify a movement level in the video signal and wherein assigning the notification value to the result of the signal analysis comprises assigning the notification value based on the identified movement level.

9. The method of claim 5, wherein the at least one external signal is an audio signal and applying the signal analysis comprises performing a sound analyses on the audio signal to identify a sound level in the audio signal and wherein assigning the notification value to the result of the signal analysis comprises assigning the notification value based on the identified sound level.

10. A system comprising:
a processing system;
a storage system; and
instructions for supporting real-world awareness stored on the storage system that, when executed by the processing system, direct the processing system to:
determine that a virtual reality application is in use;
in response to determining that the virtual reality application is in use, begin monitoring for external signals by at least accessing an available sensor of a computing device;
detect at least one external signal while monitoring for the external signals;
in response to detecting the at least one external signal, determine a level of notification for an interruption notification of the virtual reality application based on the at least one external signal;
receive context of the virtual reality application;
after determining the level of notification and receiving the context, determine a type for the interruption notification of the virtual reality application based on both the determined level of notification and the context of the virtual reality application, wherein the type for the interruption notification comprises a degree of transparency of the notification interruption; and
provide the interruption notification to the virtual reality application based on the determined type.

11. The system of claim 10, wherein the at least one external signal comprises at least one of an audio signal or a video signal.

12. The system of claim 10, wherein the instructions that determine the type for the interruption notification of the virtual reality application further direct the processing system to:
access a mapping resource storing a mapping data structure to identify the type associated with the determined level of notification and the context of the virtual reality application.

13. The system of claim 10, wherein the instructions that receive of the context of the virtual reality application further direct the processing system to:
detect user input signals to the virtual reality application or accessing a graph structure.

14. The system of claim 10, wherein the instructions that determine of the level of notification for the interruption notification of the virtual reality application further direct the processing system to:
from the at least one external signal, apply a signal analysis;
assign a notification value to a result of the signal analysis; and
for each result with a notification value that meets a threshold value, map the notification value to an appropriate level of notification, the appropriate level being the level of notification for the interruption notification.

15. One or more computer readable storage media having instructions stored thereon that, when executed by a processing system, direct the processing system to at least:
determine that a virtual reality application is in use;
in response to determining that the virtual reality application is in use, begin monitoring for external signals by at least accessing an available sensor of a computing device;
detect at least one external signal while monitoring for the external signals;
in response to detecting the at least one external signal, determine a level of notification for an interruption notification of the virtual reality application based on the at least one external signal;
receive context of the virtual reality application;
after determining the level of notification and receiving the context, determine a type for the interruption notification of the virtual reality application based on both the determined level of notification and the context of the virtual reality application, wherein the type for the interruption notification comprises a degree of transparency of the notification interruption; and
provide the interruption notification to the virtual reality application based on the determined type.

16. The media of claim 15, wherein the at least one external signal comprises at least one of an audio signal or a video signal.

17. The media of claim 15, wherein the instructions that determine the type for the interruption notification of the virtual reality application further direct the processing system to at least:
access a mapping resource storing a mapping data structure to identify the type associated with the determined level of notification and the context of the virtual reality application.

18. The media of claim 15, wherein the instructions that receive of the context of the virtual reality application further direct the processing system to at least:
detect user input signals to the virtual reality application or accessing a graph structure.

19. The media of claim 15, wherein the instructions that determine of the level of notification for the interruption notification of the virtual reality application further direct the processing system to at least:
from the at least one external signal, apply a signal analysis;
assign a notification value to a result of the signal analysis; and
for each result with a notification value that meets a threshold value, map the notification value to an appropriate level of notification, the appropriate level being the level of notification for the interruption notification.

20. The media of claim 19, wherein the at least one external signal is a video signal and the instructions that apply the signal analysis further direct the processing system to at least:
perform facial recognition on the video signal to identify one or more people in the video signal;
obtain user context information, wherein the user context information comprises contact information of the user of the virtual reality application; and determine whether each of the one or more identified people is a person of interest to the user based on the obtained contact information; and wherein the instructions that assign the notification value to the result of the signal analysis further direct the processing system to at least:
  assign the notification value based on whether each of the one or more people are determined to be the person of interest and a relationship to the user.

* * * * *